UNITED STATES PATENT OFFICE

1,993,040

PARASITICIDE DERIVED FROM HIGHER ALCOHOLS

Paul L. Salzberg and Euclid W. Bousquet, Wilmington, Del., assignors, by mesne assignments, to The Grasselli Chemical Company, Cleveland, Ohio, a corporation of Delaware No Drawing. Application December 29, 1932, Serial No. 649,449

12 Claims. (Cl. 167—22)

The present invention relates to parasiticides which are compounds of the type formula $$R-(CNX)$$

in which R is an aliphatic radical containing at least 6 carbon atoms and X is an element of the sulfur group, namely sulfur, selenium or tellurium; the group (CNX) standing for the thiocyano or iso-thiocyano radical and their corresponding selenium and tellurium analogs.

We found that these various thio-seleno-telluro cyanates of higher aliphatic alcohols and their isomerides are exceedingly toxic towards lower forms of life; they are particularly useful as insecticides and specially as contact insecticides against soft bodied insects, such as aphids, flies, etc. They are also useful against fungi and other micro-organisms.

Chemically, our novel parasiticides can be designated as higher alkyl-thiocyanates, iso-thiocyanates, selenocyanates, iso-selenocyanates, tellurocyanates and iso-tellurocyanates. These compounds can further be considered as esters of thiocyanic, iso-thiocyanic acids and their corresponding seleno and telluro analogs with aliphatic alcohols of at least 6 carbon atoms from which they can be obtained by various chemical reactions.

The higher aliphatic alcohols of 6 and more carbon atoms have recently become commercially available through synthetic methods, such as hydrogenation of fatty acids and their esters and through high pressure hydrogenation of carbon monoxide.

While such higher alcohols are the most convenient raw materials to prepare our novel parasiticides, we can also produce them from monochlorinated paraffin hydrocarbons by various chemical reactions.

Our invention is furthermore not limited to such thiocyanates, iso-thiocyanates and their seleno and telluro analogs in which the substituent is attached to a primary carbon atom but secondary as well as tertiary thiocyanates, etc. have valuable parasiticidal action.

Our invention is furthermore not limited to such of the thiocyanates, etc. in which the alkyl group is a straight chain, saturated hydrocarbon radical of at least 6 carbon atoms, but it includes also those alkyl thiocyanates, etc. in which the alkyl group of at least 6 carbon atoms comprises a branched chain and the alkyl group can be unsaturated as well as saturated.

In the following we are listing a number of alkyl radicals which, when combined with the iso-thio, seleno, iso-seleno, telluro, iso-telluro cyano radicals, have given valuable parasiticides:

2-methylpentanyl-1; 4-methylhexanyl-1; octyl; 2,4-dimethylhexanyl-1; 2,6-dimethylhexanyl-1; nonyl; cetyl; 2,6-dimethyloctanyl-1; stearyl; oleyl; carnaubyl; melissyl; lauryl; sec. dodecanyl; 2,4,6-trimethyldecanyl-1; 2,4,6,8-tetramethyldecanyl-1; paraffins up to for instance 24 carbon atoms.

These new insecticides have been tested in various forms and applications against agricultural pests and have been found to be toxic against such pests, particularly against insects and more specifically against soft bodied insects, such as aphids, flies, etc. They seem to be most efficient as contact insecticides.

Our novel insecticides can be used alone or mixed with diluents such as kerosene or mineral oil, or they can be applied in aqueous emulsions. They may also be absorbed on an inert filler such as diatomaceous earth and applied in the form of a dust.

For use against sucking insects on growing plants, however, we prefer to use the higher alkyl thiocyanates, etc., particularly those of 12 and more carbon atoms in the alkyl group in the form of aqueous emulsions, with various emulsification agents and spreaders.

The following table summarizes the toxic effect obtained with a few of the more typical representation of our novel insecticides.

*Insecticidal efficiency of higher alkyl thiocyanates*

| Compound | | Spreader | Insect | Kill |
|---|---|---|---|---|
| | | | | *Per cent* |
| Lauryl thiocyanate | (0.05%) | Sulfonated fish oil (0.25%) | Black Chrysanthemum aphids | 95.7 |
| Lauryl thiocyanate | (0.05%) | Sulfonated fish oil (0.25%) | Green Chrysanthemum aphids | 95.9 |
| Lauryl thiocyanate | (0.1%) | Sulfonated fish oil (0.25%) | Thrips | 100.0 |
| Lauryl thiocyanate | (0.1%) | Sulfonated fish oil (0.2%) | Black Nasturtium aphids | 97.0 |
| Lauryl thiocyanate | (0.05%) | Sulfonated fish oil (0.2%) | Cabbage aphids | 99.4 |
| Lauryl thiocyanate | (0.1%) | Lecithin-butyl alcohol (0.1%) | Cabbage aphids | 100.0 |
| Lauryl thiocyanate | (0.1%) | Sulfonated abietene (0.1%) | Cabbage aphids | 100.0 |
| Laurol[1] thiocyanate | (0.1%) | Sulfonated abietene (0.1%) | Cabbage aphids | 100.0 |
| Laurol thiocyanate | (0.1%) | Sulfonated fish oil (0.2%) | Cabbage aphids | 98.9 |
| Octyl[2] thiocyanate | (0.1%) | Sulfonated fish oil (0.2%) | Black Chrysanthemum aphids | 95.9 |
| Cetyl thiocyanate | (0.1%) | Sulfonated fish oil (0.2%) | Black Chrysanthemum aphids | 99.6 |
| Stearyl thiocyanate | (0.1%) | Sulfonated fish oil (0.2%) | Black Chrysanthemum aphids | 97.8 |
| Lauryl thiocyanate | (0.025%) | Sulfonated fish oil (0.2%) | Green Chrysanthemum aphids | 96.8 |
| Octyl[2] thiocyanate | (0.1%) | Sulfonated fish oil (0.2%) | Green Chrysanthemum aphids | 88.4 |

[1] Laurol is the technical mixture of higher alcohols (8–18 carbon atoms) produced by hydrogenating coconut oil or coconut oil acids.
[2] Prepared from crude octyl alcohols obtained from the hydrogenation of carbon monoxide.

In place of the emulsifying agents listed in the above table we may use ordinary soap, pure sodium oleate, sodium fish oil soaps, casein, calcium caseinate, sulfonated petroleum, alkyl naphthalene sulfonic acids, sodium resinate, amine salts of higher fatty acids, etc.

Our novel parasiticides can also be used in combination with other insecticides and fungicides such as nicotine, pyrethrum, rotenon, mineral oil emulsions, fluorine compounds, arsenicals, lime sulfur, Bordeaux mixtures, etc.

As a spray against flies we might cite the following showing the toxicity of our novel parasiticides.

A 5% solution of lauryl thiocyanate in kerosene is sprayed into a confined space containing flies. After several minutes the flies cease all motion and unlike the results obtained with pyrethrum, none of the flies recovered from the initial paralytic effect.

The higher alkyl thiocyanates have several important advantages over materials used up to now. One of the chief advantages is their high toxicity in low concentrations and this is particularly true of those containing at least twelve carbon atoms. In this respect they are much more effective than the lower alkyl thiocyanates. Ethyl and methyl thiocyanates are too volatile to have any merit for use outside of the field of fumigants. Even butyl thiocyanate is not sufficiently high-boiling or sufficiently toxic to be satisfactory for use in contact insecticides. It is a surprising fact that although the thiocyanate content decreases as the length of the alkyl chain increases, the toxicity of higher members of this group is much greater than that of the lower thiocyanates. Furthermore, the higher alkyl thiocyanates, particularly those containing at least 12 carbon atoms, are surprisingly free from odor.

Concurrently with the increase of the carbon atom in the alkyl group there is an increase in toxicity and our best parasiticides are found in the group of derivatives containing alkyls with 12 or more carbon atoms. Furthermore our novel parasiticides do not contain any negative groups such as O—CO—R or others and are, therefore, perfectly stable in water and do not lose their toxicity on storage of their aqueous emulsions.

The thiocyanates of the higher alcohols obtained in the pressure hydrogenation of carbon monoxide are liquids at ordinary temperature or have a low melting point. They can be distilled without substantial decomposition, particularly at reduced pressure and they are substantially insoluble in water. They are characterized by their chemical formula R—SCN where R is a branched hydrocarbon chain of at least 6 carbon atoms.

These thiocyanates are conveniently prepared in the following manner: The alcohols are first reacted upon with hydrobromic and sulfuric acid whereby the corresponding bromides are formed. These are heated in ethylalcoholic solution with sodium thiocyanate, sodium bromide being precipitated, the filtered solution is distilled and thiocyanate fraction recovered.

We claim:

1. A parasiticide comprising a compound of the formula

R—(CNX)

in which R is an aliphatic hydrocarbon radical directly attached to the (CNX) group containing at least 6 carbon atoms, X is an element of the sulfur group consisting of sulfur, selenium and tellurium, and the group (CNX) stands for the radicals thiocyano, iso-thiocyano, selenocyano, iso-selenocyano, tellurocyano and iso-tellurocyano.

2. A parasiticide comprising a compound of the formula

R—(CNS)

in which R is an aliphatic hydrocarbon radical directly attached to the (CNS) group containing at least 6 carbon atoms and (CNS) stands for the thiocyano and iso-thiocyano radicals.

3. A parasiticide comprising an aliphatic thiocyanate in which the aliphatic hydrocarbon radical is directly attached to the thiocyanate group and contains at least 6 carbon atoms.

4. A parasiticide comprising an aliphatic thiocyanate in which the aliphatic hydrocarbon radical is directly attached to the thiocyanate group and contains at least 12 carbon atoms.

5. A parasiticide comprising an aliphatic thiocyanate in which the radical attached to the thiocyano group is a straight chain aliphatic hydrocarbon radical containing from 12 to 24 carbon atoms.

6. A parasiticide comprising a compound of the formula

R—(CNX)

in which R is an aliphatic hydrocarbon radical directly attached to the (CNX) group containing at least 12 carbon atoms, X is an element of the sulfur group consisting of sulfur, selenium and tellurium, and the group (CNX) stands for the radicals thiocyano, iso-thiocyano, selenocyano, iso-selenocyano, tellurocyano and iso-tellurocyano.

7. A parasiticide comprising a compound of the formula

R—(CNS)

in which R is an aliphatic hydrocarbon radical directly attached to the (CNS) group containing at least 12 carbon atoms and (CNS) stands for the thiocyano and iso-thiocyano radicals.

8. A contact insecticide comprising a compound of the formula

R—(CNX)

in which R is an aliphatic hydrocarbon radical directly attached to the (CNX) group, containing at least 6 carbon atoms, X is an element of the sulfur group consisting of sulfur, selenium and tellurium, and the group (CNX) stands for the radicals thiocyano, iso-thiocyano, selenocyano, iso-selenocyano, tellurocyano and iso-tellurocyano.

9. A contact insecticide comprising a compound of the formula

R—(CNS)

in which R is an aliphatic hydrocarbon radical directly attached to the (CNS) group, containing at least 12 carbon atoms.

10. A parasiticide comprising cetyl-thiocyanate.

11. A parasiticide comprising stearyl-thiocyanate.

12. A parasiticide comprising octyl-thiocyanate.

PAUL L. SALZBERG.
EUCLID W. BOUSQUET.